United States Patent [19]

Belasco

[11] 3,928,191

[45] Dec. 23, 1975

[54] BIODEGRADATION OF METHANOLIC WASTE WATER

[75] Inventor: Irvin Joseph Belasco, Wilmington, Del.

[73] Assignee: E. I. DuPont de Nemours & Co., Wilmington, Del.

[22] Filed: Aug. 2, 1974

[21] Appl. No.: 494,295

Related U.S. Application Data

[63] Continuation of Ser. No. 295,662, Oct. 6, 1972, abandoned.

[52] U.S. Cl. .................. 210/12; 210/15; 210/18
[51] Int. Cl.² ........................................ C02C 5/10
[58] Field of Search ............ 210/42, 11, 12, 59, 63, 210/15, 18, 36, 40, DIG. 21, 2; 252/449; 195/3 H, 2; 260/693 R, 693 C, 693 G, 693 F

[56] References Cited
UNITED STATES PATENTS

| | | | |
|---|---|---|---|
| 2,296,523 | 9/1942 | Henry | 210/36 |
| 3,502,566 | 3/1970 | Raymond et al. | 210/11 |
| 3,616,204 | 10/1971 | Linn | 195/2 |
| 3,634,227 | 1/1972 | Patterson | 210/11 |
| 3,769,164 | 10/1973 | Azarowicz | 210/11 |
| 3,843,517 | 10/1974 | McKinney | 210/11 |

OTHER PUBLICATIONS

Weaver et al., *Enhancement of Bacterial Methane Oxidation by Clay Minerals*, Nature Vol. 237, June 30, 1972, p. 518.

*Primary Examiner*—Thomas G. Wyse
*Assistant Examiner*—Benôit Castel

[57] ABSTRACT

Biodegradation of the organic content of methanolic waste water is accelerated by presence of dispersed particulate attapulgite or montmorillonite.

1 Claim, No Drawings

BIODEGRADATION OF METHANOLIC WASTE WATER

CROSS-REFERENCE TO RELATED APPLICATION

This application is a continuation of my copending application Ser. No. 295,662, filed Oct. 6, 1972 now abandoned.

BACKGROUND OF THE INVENTION

Japanese Patent Publication No. 140/1971, laid open to public inspection on July 30, 1971, discloses purification of waste water by subjecting it to the activated sludge secondary treatment in presence of activated carbon or Fuller's earth. Data in the publication indicate that presence of Fuller's earth improves removal of total organic carbon (TOC) but does not improve removal of biochemical oxygen demand (BOD). This is indicative of adsorption of the organics on the clay surfaces, but does not indicate a microbial biodegradation.

SUMMARY OF THE INVENTION

It has now been found that the rate of microbial biodegradation of methanolic waste water can be accelerated by carrying out the biodegradation in the presence of dispersed, particulate attapulgite or montmorillonite clay. Microbes suitable for this type of biodegradation are abundant in, for instance, river water, soil, activated sludge, and raw sewage. By methanolic waste water is meant water having an organic content of about 0.01 to 10% (preferably 0.05 to 5%) by weight, at least 80% of which is methanol. The waste water can contain as much as 2% by weight KCl and other inorganic salts.

The process is carried out at a pH in the range of about 6 to 8 (preferably 6.5 to 7.5) and temperature in the range of about 5° to 38°C (preferably 30° to 35°C.) The average particle size of the clay is in the range of about 0.5 to 40 microns and the clay concentration is in the range of about 10 to 10,000 ppm (preferably 200 to 1000 ppm).

The process can be carried out in a biological reactor or aerated lagoon. The clay can be maintained in suspension by appropriate agitation from stirring devices or aerators. The pH can be maintained by addition of alkaline materials such as ammonia, calcium oxide, caustic, or lime, or by use of a buffer.

Any of the clays selected from the montmorillonoid or attapulgite groups listed in *Handbook of Insecticide Dust Diluents and Carriers*, 2nd. Edition, Dorland Books, 1955, can be used. Preferred clays include Blue Panther Creek Bentonite, Wyogel, Attaclay and Volclay.

The acceleration of waste biodegradation increases the handling capacity of biochemical reactors and thus reduces costs.

EXAMPLES

For Examples 1–4 a static test system, fashioned after that described by Hiser and Busch (Jour. Water Pollution Control Fed. 36:505–516, 1964), was used to (1) facilitate acclimation of sewage microorganisms to biodegrade methanolic waste water and to (2) permit assessment of numerous variables. In these examples, 100 ml of microbial inoculum, 100 ml inorganic nutrient salt solution, 200 ml of dilute methanolic waste water, 90 ml of additional water, and 10 ml of 0.1 molar phosphate buffer were placed in a graduated cylinder or an Erlenmeyer flask. The solids, including the solids of the microbial inoculum were kept in suspension through the use of a magnetic stirrer. The systems were aerated, via gas diffuser stones, at a rate of 0.2 to 1 ft.$^3$/hour. Microbial degradation was continued for periods up to 24 hours, during which samples were withdrawn at various time intervals for total oxygen demand (TOD), chemical oxygen demand (COD), rate of oxygen uptake, and pH determinations. The original microbial inoculum was derived from samples of activated sludge from a domestic sewage treatment plant. Certain microbial species in the sludge were acclimated to the biodegradation of the methanolic waste over a 2- to 3-week period. Thereafter, the inoculum was a residue from a prior run.

The pH of the systems was maintained between 6 and 8, with an optimum range of 6.5 to 7.5, through the use of the phosphate buffer. All of the examples were operated at ambient temperature.

The methanolic waste water was obtained by diluting by 133-fold a waste stream having the composition:

TABLE I

| Component | % |
|---|---|
| Methanol | 19.8 |
| Acetonitrile | 0.2 |
| Acetaldoxime | 0.9 |
| Acetonoxime | 0.3 |
| Acetohydroxamic acid, thiol-S-methylester | 1.1 |
| $H_2O$ | 77.7 |
|  | 100.0 |

The inorganic salt solution contained ammonium sulfate (0.5 gm/l.) $KH_2PO_4$ (0.8 gm/l.), $K_2HPO_4$ (0.8 gm/l.), $MgSO_4$ (0.2 gm/l.), $FeSO_4$ (0.04 gm/l.) and calcium chloride (0.1 gm/l.); the solution contained adequate N and P and other trace inorganic nutrients for optimum microbial growth.

EXAMPLE 1

The methanolic waste water was subjected to microbial biodegradation in the presence of Blue Panther Creek clay at concentrations of 2,000 to 10,000 ppm. It was evident from the results obtained that this type of bentonite significantly accelerated the bio-oxidation of the organic components of the waste water (Table II). Also the rate of oxygen uptake, determined 5 hours after start-up was indicative of improved microbial activity and oxidation in the presence of clay.

TABLE II

|  | 1 | 2 | 3 | 4 |
|---|---|---|---|---|
| Period of operation, hrs | 24 | 24 | 24 | 24 |
| Initial TOD, ppm | 1144 | 1117 | 1140 | 1166 |
| Final TOD, ppm | 533 | 152 | 140 | 119 |
| % TOD removal | 53 | 87 | 88 | 90 |
| $O_2$ uptake rate, mg/l/hr (after 5 hrs) | 7.9 | 13.1 | 15.5 | 20.1 |

TABLE II-continued

|  | 1 | 2 | 3 | 4 |
| --- | --- | --- | --- | --- |
| Concentration of Blue Panther Creek clay, ppm | 0 | 2,000 | 6,000 | 10,000 |

EXAMPLE 2

Attaclay, representative of the attapulgite clays, was compared with Volclay, Wyogel and Blue Panther Creek clay, representative of the bentonites, in their ability to accelerate the biodegradation of the methanolic waste water. The total and chemical oxygen demand data in Table III clearly demonstrate the efficacy of these clay supplements in promoting the bio-oxidation of the soluble organic components of the waste water.

TABLE III

|  | No Clay | Attaclay | Volclay | Wyogel | Blue Panther Creek Clay |
| --- | --- | --- | --- | --- | --- |
| Period of operation, hrs | 24 | 24 | 24 | 24 | 24 |
| Initial TOD, ppm | 1201 | 1183 | 1166 | 1328 | 1203 |
| Final TOD, ppm | 415 | 150 | 280 | 153 | 184 |
| Initial COD, ppm | 917 | 917 | 917 | — | — |
| Final COD, ppm | 306 | 127 | 200 | — | — |
| % TOD removal | 65 | 87 | 76 | 88 | 84 |
| % COD removal | 66 | 86 | 78 | — | — |
| Clay concentration, ppm | — | 2,000 | 2,000 | 2,000 | 2,000 |

EXAMPLE 3

In this example the concentration of Attaclay and Blue Panther Creek clay was reduced to 200 ppm in the waste water and the test was conducted under the same conditions as in Example 1. After 8 hours operation (Table IV) the TOD removal in the clay supplemented systems was approximately three times that noted in the system without clay. Higher oxygen uptake rates in the clay supplemented systems was indicative of increased microbial activity in biodegrading the organic waste components.

TABLE IV

|  | No Clay | Attaclay | Blue Panther Creek Clay |
| --- | --- | --- | --- |
| Period of operation, hrs | 8 | 8 | 8 |
| Initial TOD, ppm | 1318 | 1266 | 1273 |
| Final TOD, ppm | 897 | 258 | 250 |
| % TOD removal | 32 | 80 | 80 |
| $O_2$ uptake rate, mg/l/hr | 24.2 | 44.3 | 60.6 |
| Clay concentration, ppm | — | 200 | 200 |

EXAMPLE 4

Blue Panther Creek clay, as low as 20 ppm in the waste water was effective in increasing the biodegradation rate of the methanolic waste water. Over a 12-hour period of operation, 85% of the TOD of the waste water was removed in the presence of clay, as opposed to 60% TOD removal in its absence.

TABLE V

|  | No Clay | Blue Panther Creek Clay |
| --- | --- | --- |
| Period of operation, hrs | 12 | 12 |
| Initial TOD, ppm | 1318 | 1270 |
| Final TOD, ppm | 528 | 195 |
| % TOD removal | 60 | 85 |
| Clay concentration, ppm | — | 20 |

EXAMPLE 5

The sorptive capacity of various clays for the organic components of the methanolic waste water treated in Examples 1–4 (except diluted only 13-fold rather than 133-fold) was determined by measuring the change in TOD of the concentrated waste after having been vigorously shaken with each of the clays at a concentration 10,000 ppm for a period of 18 hours. No bacterial inoculum was used in these tests. The results shown in Table VI indicate that the sorptive capacity of the clays for the organic waste components was insignificant or of a very low order of magnitude.

TABLE VI

|  | TOD, ppm | | | % TOD Loss |
| --- | --- | --- | --- | --- |
|  | Initial | Final | Change |  |
| Undiluted waste water | 23,349 | 23,200 | −149 | 0.6 |
| " + 10,000 ppm Attaclay | 23,349 | 22,527 | −822 | 3.5 |
| " + 10,000 ppm Volclay | 23,349 | 23,083 | −266 | 1.1 |
| " + 10,000 ppm Wyogel | 23,349 | 23,061 | −288 | 1.2 |

TABLE VI-continued

|  | TOD, ppm | | | % TOD |
|---|---|---|---|---|
|  | Initial | Final | Change | Loss |
| " + 10,000 ppm Blue Panther Creek Clay | 23,349 | 23,445 | +96 | −0.4 |

EXAMPLE 6

In this example, a laboratory continuous-flow bioreactor, similar to that used by Swisher et al. (JAOCS 41:746–752, 1964) was used to evaluate the influence of Blue Panther Creek clay on the biodegradation of the methanolic waste water. The use of a continuous-flow bio-reactor permits study of waste treatment under conditions resembling full scale treatment plants. The reactor was charged with inoculum consisting of 400 ml. of residual from a previous day's static test of the type described in Examples 1–4. A feedstock was made up, consisting of 2400 ml. of the methanolic waste water used in Examples 1–4, 1200 ml of the inorganic salt solution used in Examples 1–4, 120 ml. of the 0.1 molar phosphate buffer, and 1080 ml. water. Feed rate was set to provide an average residence time of 12 hours for waste water in the bio-reactor. Steady state conditions were achieved after 12 hours of operation. TOD and COD removal demonstrated that the presence of 200 ppm Blue Panther Creek clay increased the rate of waste biooxidation approximately 2.5 times.

TABLE VII

|  | No Clay | Blue Panther Creek Clay |
|---|---|---|
| Influent TOD, ppm | 1349 | 1349 |
| Effluent TOD, ppm — after 26 hrs of operation | 873 | 202 |
| Effluent TOD, ppm — after 40 hrs of operation | 831 | 149 |
| Influent COD, ppm | 1248 | 1248 |
| Effluent COD, ppm — after 26 hrs of operation | 733 | 160 |
| Effluent COD, ppm — after 40 hrs of operation | 455 | 184 |
| % TOD removal — after 26 hrs of operation | 35 | 85 |
| % TOD removal — after 40 hrs of operation | 38 | 89 |
| % COD removal — after 26 hrs of operation | 41 | 87 |
| % COD removal — after 40 hrs of operation | 64 | 85 |
| $O_2$ uptake rate (mg/l/hr) — after 26 hrs of operation | 26.3 | 36.8 |
| $O_2$ uptake rate (mg/l/hr) — after 40 hrs of operation | 29.4 | 38.5 |
| Clay feed rate, ppm of waste water feed | — | 200 |
| Average residence time of waste water in bio-reactor, hrs | 12 | 12 |

I claim:

1. A process for purifying methanolic waste water having an organic content of about 0.7% by weight, at least 80% of which is methanol and including at least one of acetonitrile, acetaldoxime, acetonoxime, and acetohydroxamic acid, thiol-S-methyl ester, which comprises subjecting said water to the action of microbes in the presence of oxygen and dispersed, particulate attapulgite or montmorillonite clay, at a pH in the range of about 6 to 8 and temperature in the range of about 5° to 38°C.; the average particle size of the clay being in the range of about 0.5 to 40 microns and the concentration of the clay being in the range of about 10 to 10,000 ppm.

* * * * *